UNITED STATES PATENT OFFICE.

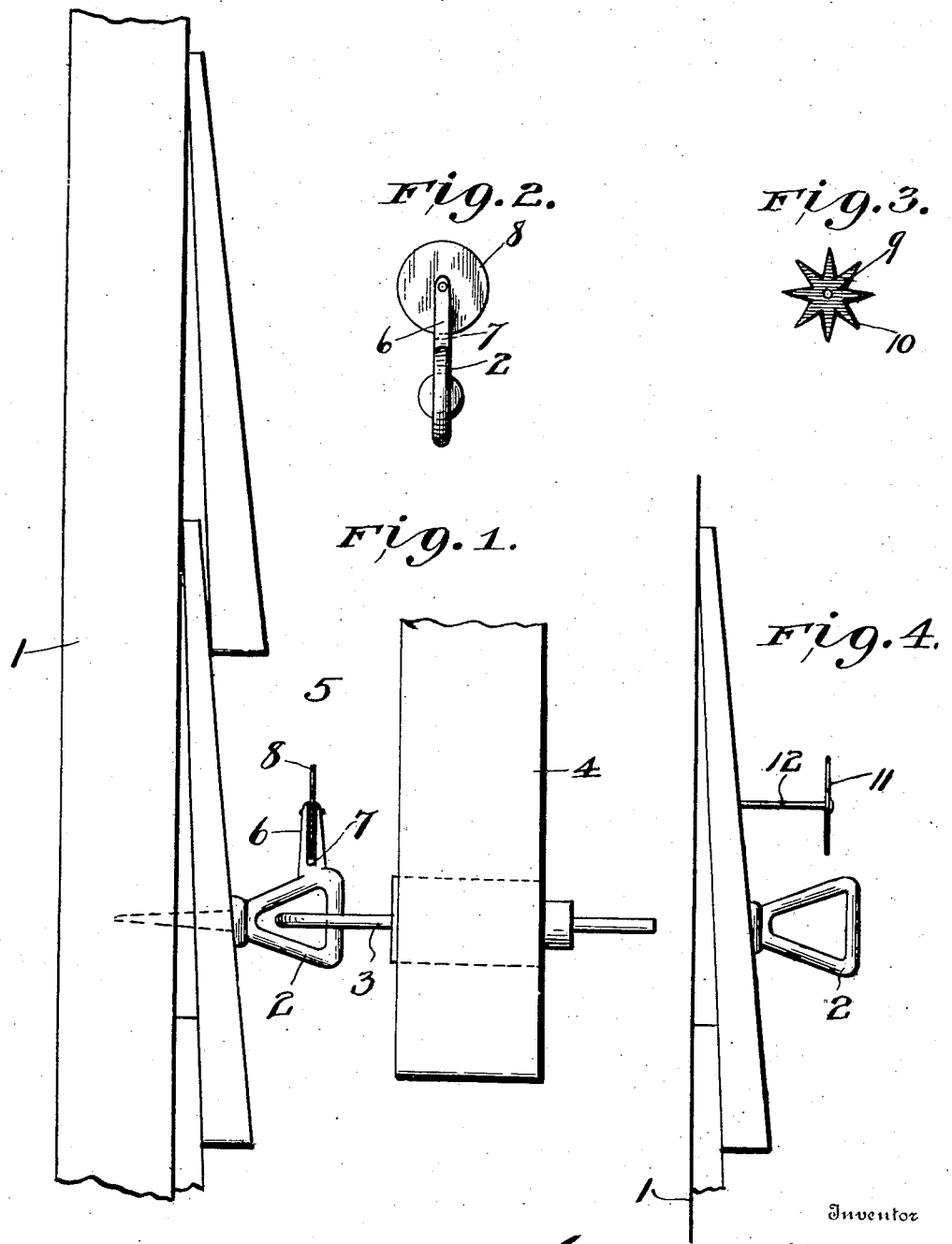

GEORGE H. FISHER, OF PLAINFIELD, NEW JERSEY.

BLIND-FASTENER.

No. 848,980.     Specification of Letters Patent.     Patented April 2, 1907.

Application filed November 30, 1906. Serial No. 345,796.

*To all whom it may concern:*

Be it known that I, GEORGE H. FISHER, a citizen of the United States, residing at Plainfield, in the county of Union, State of New Jersey, have invented certain new and useful Improvements in Blind-Fasteners; and I do declare the following to be a full, clear, and exact description of the invention, such as will enable others skilled in the art to which it pertains to make and use the same.

My invention relates to an improvement in blind-fasteners, and has for its object to provide a device for preventing sparrows and other birds from roosting on the keeper of the fastener behind the blinds and disfiguring the side of the building.

It also has for its object to provide a device which is exceedingly simple, inexpensive, and durable in construction and easy and effective in use.

It consists of the several features and combination of features, as more fully hereinafter described and claimed.

Referring to the drawings, Figure 1 is a side elevation of the blind-fastener with my invention in place on the keeper thereof and showing a portion of a blind and a building-wall. Fig. 2 is a front view of the keeper. Fig. 3 is a side view of a modified form of disk or wheel. Fig. 4 is another modified form of the device, showing the disk or wheel mounted just above and independently of the keeper.

In the drawings, in which like numerals of reference denote like parts throughout the several views, 1 represents the side wall of the building; 2, the keeper of the fastener, which is screwed into the wall 1 and is designed to engage with the hook 3 upon the blind 4.

5 indicates the space between the wall and the blind in which the sparrows are accustomed to occupy while roosting on the keeper. The keeper is provided with an upwardly-extending spur 6, provided with a vertical slot 7, and 8 is a circular disk or wheel made, preferably, of thin steel or other suitable material. In the modified form of disk or wheel shown in Fig. 3, 9 indicates the disk, which is provided with a series of points 10.

In the modification shown in Fig. 4 the disk or wheel 11 is mounted on a shaft 12, secured to the side of the house independent of and just above said keeper. By mounting the disk on a separate shaft, as just described, it can be used with any and all blind-fasteners, no matter what their style may be.

I do not desire to be understood as limiting myself to the specific details of construction and arrangement as herein described and illustrated, as it is manifest that variations and modifications may be made in the features of construction and arrangement on the adaptation of the device to the various conditions of use without departing from the spirit and scope of my invention and improvements. I therefore reserve the right to all such variations and modifications as properly fall within the scope of my invention and the terms of the following claims.

What I claim is—

1. In a blind-fastener, a keeper designed to be placed between a blind and the wall of a house and provided with a rotatable member for preventing birds from roosting on the keeper so mounted on said keeper as to be spaced from said wall and said blind, substantially as described.

2. In a blind-fastener a keeper provided with a slot and a rotatable member mounted in said slot, substantially as described.

3. In a blind-fastener a keeper provided with a spur and a rotatable member mounted thereon, substantially as described.

4. In a blind-fastener a keeper provided with a spur having a slot and a rotatable member mounted in said slot, substantially as described.

5. In a blind-fastener, a keeper provided with a slot and a rotatable member mounted in said slot and having a series of points, substantially as described.

6. In a blind-fastener, a keeper designed to be placed between a blind and the wall of a house and provided with a rotatable member having a series of points, said rotatable member being so mounted on said keeper as to be spaced from said wall, substantially as described.

In testimony whereof I affix my signature in presence of two witnesses.

GEORGE H. FISHER.

Witnesses:
BATEMAN THATCHER,
JOHN N. GULICK.